US010771537B2

(12) United States Patent
Caissy et al.

(10) Patent No.: US 10,771,537 B2
(45) Date of Patent: Sep. 8, 2020

(54) TECHNOLOGIES FOR SCRAMBLING IN LOAD BALANCERS (71) Applicant: Intel Corporation, Santa Clara, CA (US)

(72) Inventors: Simon Perron Caissy, Saint-Constant (CA); Carl Geoffrion, Saint-Jean-sur-Richelieu (CA); Eduardo Romero, St Jean sur Richelieu (CA)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 16/023,257

(22) Filed: Jun. 29, 2018

(65) Prior Publication Data

US 2020/0007617 A1  Jan. 2, 2020

(51) Int. Cl.
*H04L 29/08* (2006.01)
*H04L 12/26* (2006.01)
*H04L 12/24* (2006.01)

(52) U.S. Cl.
CPC ........ *H04L 67/1002* (2013.01); *H04L 41/142* (2013.01); *H04L 43/16* (2013.01); *H04L 69/324* (2013.01)

(58) Field of Classification Search
CPC .................................................. H04L 67/1002
See application file for complete search history.

(56) References Cited

U.S. PATENT DOCUMENTS

| 9,049,137 | B1* | 6/2015 | Markine | H04L 12/18 |
| 2004/0008681 | A1* | 1/2004 | Govindarajan | H04L 29/06 370/394 |
| 2017/0346765 | A1* | 11/2017 | Immidi | H04L 49/354 |
| 2018/0034724 | A1* | 2/2018 | Fedyk | H04L 45/123 |
| 2018/0309822 | A1* | 10/2018 | Baradaran | H04L 67/1008 |

* cited by examiner

*Primary Examiner* — Kevin M Cunningham
(74) *Attorney, Agent, or Firm* — Barnes & Thornburg LLP (57) ABSTRACT Technologies for applying a scrambling function in unfair load balancing scenarios include a network device having a communication circuitry and compute engine executing software on the network device. The compute engine is to determine, using a load balancing function, a distribution for data sets to each of multiple bins. Each bin maps to a destination. The network device determines, as a function of the distribution, an unfairness score indicative of the distribution being unequal among each of the destinations. In response to a determination that the unfairness score exceeds a specified threshold, the network device enables a scrambling function to be performed during configuration of the plurality of bins with the destinations.

25 Claims, 8 Drawing Sheets

TECHNOLOGIES FOR SCRAMBLING IN LOAD BALANCERS

BACKGROUND

Load balancers distribute network traffic between two or more compute devices. In doing so, the network load balancer can balance processing workloads, provide redundancy, provide scalability, and increase availability in a computer network. In some environments, a load balancer distributes incoming network traffic between interfaces of a single logical entity. Further, a load balancer may be programmed as part of the hardware of a network device, such as a network switch.

Generally, a load balancer may determine a destination for network traffic using a hash function, such as a cyclic redundancy check (CRC) algorithm. The resulting value from the hash function is then used to determine an index to a bin that maps to a given destination (e.g., a port number or host address). In some cases, the hash function is programmed on the hardware of the network device. For instance, CRC32 is a typical hash function that is programmed on network device hardware for load balancing, often for cost considerations. While hash functions such as CRC32 are generally effective for load balancing large uniform input distributions, using such hash functions may produce unfairness scenarios (e.g., scenarios where traffic is distributed heavily to one destination over others) with non-uniform sequential distributions. Non-uniform sequential distributions are common in data centers where compute devices are assigned sequential network addresses (e.g., media access control (MAC) or Internet Protocol (IP) addresses).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
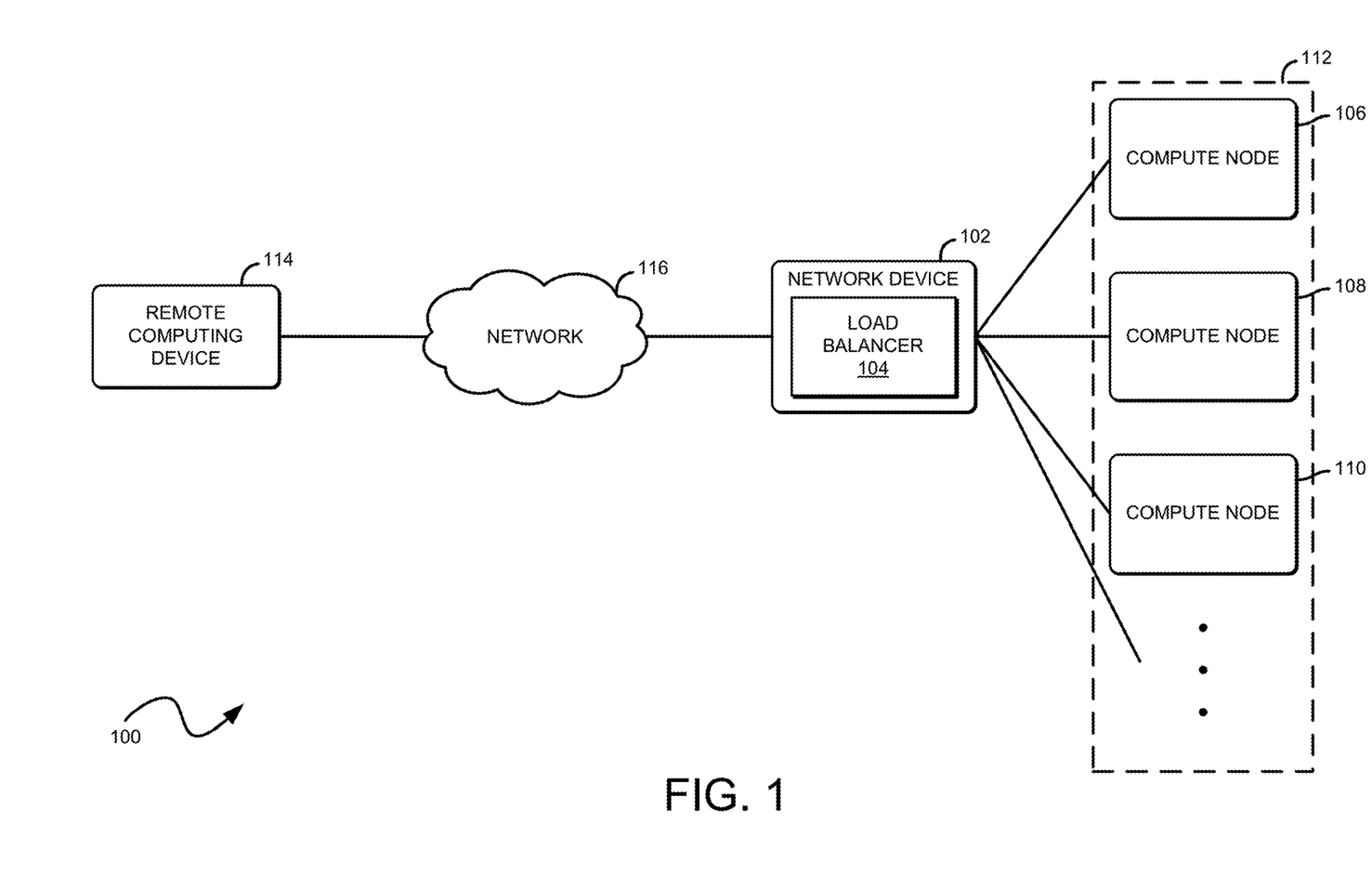
FIG. 1 is a simplified block diagram of at least one embodiment of a computing environment to apply a scramble function to incoming network traffic flows by a load balancer.

Referring now to FIG. 1, an example computing environment 100 for applying a scramble function to incoming network flows is shown. Illustratively, the computing environment 100 includes a network device 102 and compute nodes 106, 108, and 110. The network device 102 may interconnect the compute nodes 106, 108, and 110 to a network 116 (e.g., the Internet). The compute nodes 106, 108, and 110 may be part of a compute cluster 112 with other compute nodes. In some cases, the compute cluster 112 may process large data workloads using each of the compute nodes. Each compute node may be representative of a physical computing device or a virtual computing instance in a cloud network. Each of the compute nodes 106, 108, and 110 may be communicatively coupled to the network device 102 via separate communication links (e.g., point-to-point links, bus links, wires, cables, light guides, etc.). In some embodiments, the compute nodes 106, 108, and 110 may include other types of network equipment, such as other network devices. In some embodiments, the computing environment 100 corresponds to a data center that houses computer systems and associated components. The data center may include numerous physical computing resources (e.g., compute, storage, memory, network, and the like) organized for a given infrastructure. The data center can contain a set of routers and switches that transport traffic between the servers and outside of the data center. Some servers in the data center may run basic Internet and intranet services needed by internal users in the organization (e.g., e-mail servers, proxy servers, DNS servers, and so on). Network security elements may also be deployed, such as firewalls, virtual private network (VPN) gateways, intrusion detection systems, and the like. In some cases, the network device 102 may be a switch device with load balancing functions in such a data center.

The network device 102 may be embodied as a network switch that, in operation, forwards traffic (e.g., network packets) from remote computing devices (e.g., a remote computing device 114) sent over the network 116 to the compute nodes of the compute cluster 112. The network device 102 may be a physical device or a virtual network switch. Further, the network device 102 includes a load balancer 104, which may be embodied as any device or circuitry (e.g., a processor, an application specific integrated circuit (ASIC), etc.) configured to receive network packets destined for the cluster 112 (e.g., from the remote computing device 114) and distribute the received network packets across the compute nodes (e.g., compute nodes 106, 108, and 110), according to a given load balancing scheme (e.g., equal-cost multi-path routing (ECMP), round-robin, etc.). Once received, the compute nodes may divide responsibility for processing the packets (e.g., performing packet forwarding operations, performing packet routing operations, performing local packet processing operations, etc.).

Generally, the load balancer 104 determines the appropriate destination using a hash function, such as the 32-bit variant of the cyclic redundancy check (CRC) algorithm. Such hash functions, while providing a fairly even distribution load of packet data to possible destinations for uniform data set, may result in a relatively uneven distribution for some sequential data sets. For example, assume that the compute nodes of the cluster 112 are each assigned IP addresses that are sequential in order. Packets containing data to be processed by the compute nodes may include packet headers that differ only in the offset specifying the IP address. Potentially, when the load balancer 104 determines destinations to a particular bin corresponding to a destination, a given compute node may receive a significant amount of traffic while another compute node does not.

As further described herein, embodiments provide techniques for applying a scrambling function to improve load balancer fairness in situations that typically yield uneven distributions, such as situations in which network traffic corresponds to non-uniform data sets that are sequential at a hash profile offset are sent to the cluster 112. The network device 102, e.g., via software executing thereon, may identify such situations by generating sample data sets to test unfairness (e.g., cases in which a distribution of data is not evenly distributed across possible destinations). The sample data sets may test a given offset, based on a predefined hash profile, at which the uniform data is otherwise sequential. The network device 102 determines, based on a input of the sample data sets (e.g., into a load balancing simulation via software executing on the network device 102), an unfairness score based on the distribution of the data sets to load balancer bins, in which each bin maps to a particular destination. Once determined, the network device 102 may compare the unfairness score against a specified threshold. An unfairness score that exceeds the threshold is indicative of a situation in which a scrambling function should be applied to input data sets that are sequential at the offset for the given hash profile.

In situations where the network device 102 load balances on a hash profile of network traffic that is exposed to sequential input at offset(s) that are subject to unfairness, the network device 102 (e.g., via software executing in the network device 102) may apply a scramble function that re-maps an assignment of the destination. The network device 102 provides a transparent layer that serves as the scramble function to scramble bins (e.g., filled by a software application) to the load balancer 104. A variety of scramble functions may be adapted for the load balancer 104. For example, a function that swaps group bits may be used to scramble the assignment of network traffic to load balancer bins. As a result, the scramble function mitigates the uneven distribution of network traffic to destinations.

Advantageously, embodiments presented herein provide a software-based approach for mitigating uneven distributions by a load balancer in cases including non-uniform sequential data sets. Consequently, modification to the hardware of the network device 102 or the load balancer 104 is unnecessary. Further, the network device 102 (e.g., via the network device software) provides a scramble function as a transparent layer that configures the underlying load balancer hardware. In addition, because the scramble function can result in a more even distribution of data in an identified unfairness scenario, improvements in network performance can be achieved.

Figure 2:
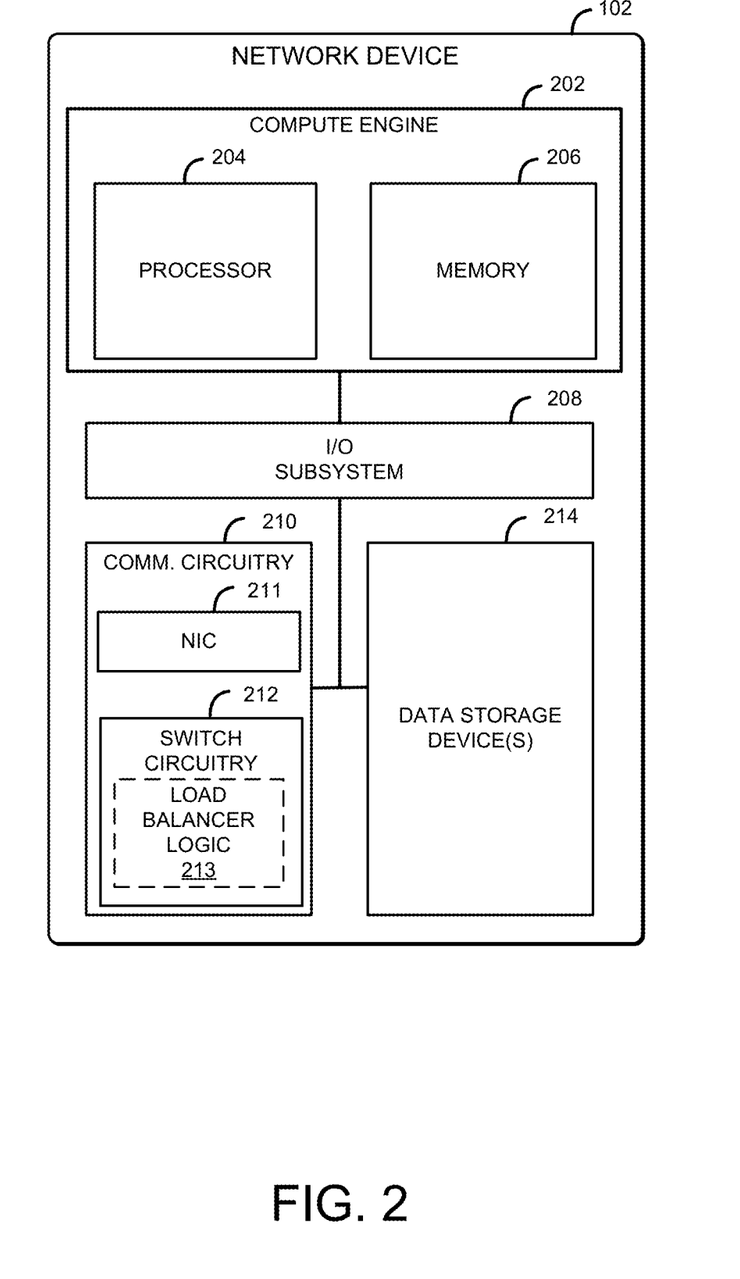
FIG. 2 is a simplified block diagram of at least one embodiment of a network device of the computing environment of FIG. 1.

Referring now to FIG. 2, a network device 102 may be embodied as any type of device capable of performing the functions described herein, including determining, using a load balancing function, a distribution for a data sets having sequential values at a specified offset, determining an unfairness score as a function of one or more parameters (e.g., a hash profile, number of bins, number of destinations, hash vector width, number of data sets, etc.), and enabling a scramble function to be performed, e.g., during a load balancing configuration phase.

As shown, the illustrative network device 102 includes a compute engine 202, an input/output (I/O) subsystem 208, communication circuitry 210, and one or more data storage devices 214. Of course, in other embodiments, the network device 102 may include other or additional components, such as those commonly found in a computer (e.g., display, peripheral devices, etc.). Additionally, in some embodiments, one or more of the illustrative components may be incorporated in, or otherwise form a portion of, another component. Of course, the components depicted in FIG. 2 are merely provided as examples to illustrate the embodiments disclosed herein. In practice, the actual network device 102 may include additional or fewer components.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204 and a memory 206. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

The memory 206 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204.

The compute engine 202 is communicatively coupled with other components of the computing environment 100 via the I/O subsystem 208, which may be embodied as circuitry and/or components to facilitate input/output operations with the compute engine 202 (e.g., with the processor 204 and/or the memory 206) and other components of the network device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the memory 206, and other components of the network device 102, into the compute engine 202.

The communication circuitry 210 may be embodied as any communication circuit, device, or collection thereof, capable of enabling communications over a network between the network device 102 and other devices, such as the compute nodes 106, 108, 110. The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a network interface controller (NIC) 211, which may also be referred to as a host fabric interface (HFI). The NIC 211 is a hardware component that connects the network device 102 to a computer network. The NIC 211 implements circuitry used to communicate using a given physical layer and data link layer standard (e.g., Ethernet, WiFi, etc.). Doing so provides a base for a full network protocol stack to allow communication among other devices. The NIC 211 includes an Ethernet port logic to connect to remote devices (e.g., other network devices, devices connected to the network 116, and the like). The NIC 211 may be embodied as one or more add-in-boards, daughtercards, controller chips, chipsets, or other devices that may be used by the network device 102 for network communications with remote devices. For example, the NIC 211 may be embodied as an expansion card coupled to the I/O subsystem 208 over an expansion bus such as PCI Express.

The communication circuitry 210 also includes switch circuitry 212, which may be embodied as any hardware, software, or circuitry to provide network switch capability. Illustratively, the switch circuitry 212 includes a load balancer logic unit 213 which may be embodied as any device or circuitry (e.g., a processor, an ASIC, etc.) configured to provide functionality for forwarding data (e.g., network traffic, sample data, etc.) to one or more compute devices (e.g., compute nodes 106, 108, 110, etc.). Further, a hashing function, such as a CRC32 algorithm, may be hardcoded into the load balancer logic unit 213. The hashing function may be used to determine an index for bins that can be mapped to a given destination, e.g., by using a bitwise AND or a shifted bitwise AND operation on the hashing function result. The load balancer logic unit 213 may be incorporated into the hardware of the switch circuitry 212.

The one or more illustrative data storage devices 214 may be embodied as any type of devices configured for short-term or long-term storage of data such as, for example, memory devices and circuits, memory cards, hard disk drives (HDDs), solid-state drives (SSDs), or other data storage devices. Each data storage device 214 may include a system partition that stores data and firmware code for the data storage device 214. Each data storage device 214 may also include an operating system partition that stores data files and executables for an operating system.

Additionally or alternatively, the network device 102 may include one or more peripheral devices. Such peripheral devices may include any type of peripheral device commonly found in a compute device such as a display, speakers, a mouse, a keyboard, and/or other input/output devices, interface devices, and/or other peripheral devices.

As described above, the network device 102 is illustratively in communication via the network 116, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
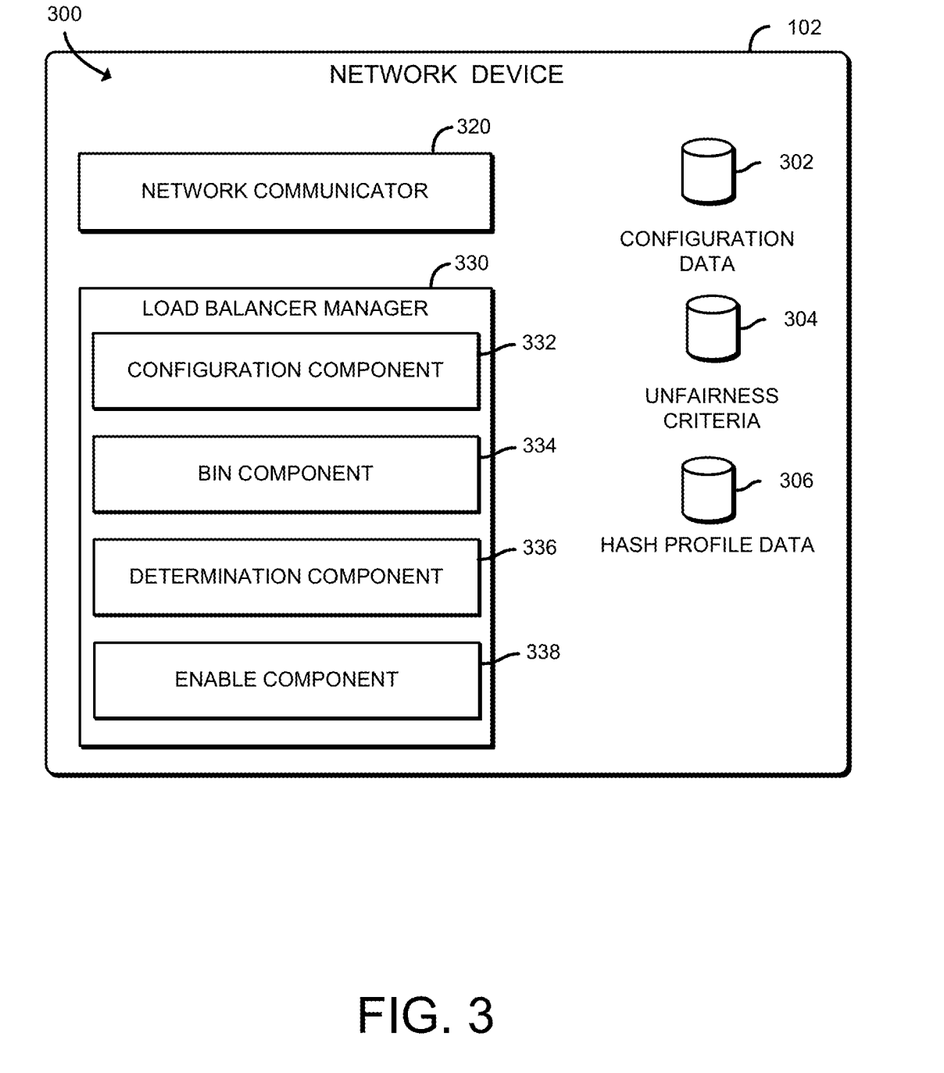
FIG. 3 is a simplified block diagram of at least one embodiment of an environment that may be established by the network device of FIG. 2.

Referring now to FIG. 3, the network device 102 may establish an environment 300 during operation. The illustrative environment 300 includes a network communicator 320 and a load balancer manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, load balancer manager circuitry 330, etc.). It should be appreciated that, in such embodiments, one or more of the network communicator circuitry 320 or load balancer manager circuitry 330 may form a portion of one or more of the NIC 211, switch circuitry 212, compute engine 202, the communication circuitry 210, the I/O subsystem 208 and/or other components of the network device 102. In the illustrative embodiment, the environment 300 includes configuration data 302, which may be embodied as any data indicative of a configuration for the load balancer 104. For example, the configuration data 302 may specify a number of bins for load balancing, a mapping of bins to destinations, an apportionment of traffic to load balance to each destination, and the like. Further, the environment 300 includes unfairness criteria 304, which may be embodied as any data indicative of thresholds and conditions under which a distribution of network traffic to network destinations exhibits unfairness (e.g., one destination receives a significant amount of network traffic over another, even if both destinations are configured to receive an equal amount of traffic). Further still, the environment 300 includes hash profile data 306, which may be embodied as any data indicative of offsets for bits that are used to hash in the hashing function.

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 102, respectively. To do so, the network communicator 320 is configured to receive and process data packets from one system or computing device and to prepare and send data packets to a computing device or system. Accordingly, in some embodiments, at least a portion of the functionality of the network communicator 320 may be performed by the communication circuitry 210, and, in the illustrative embodiment, by the switch circuitry 212.

The load balancer manager 330, which may be embodied as hardware, firmware, software, virtualized hardware, emulated architecture, and/or a combination thereof, is to determine a distribution for data sets to load balancer bins, in which each data set has a sequential value at a offset specified in a hash profile, determine an unfairness score indicative of a distribution being unequal among each of the destinations, and enable a scrambling function to be performed during a load balancing configuration phase. To do so, the load balancer manager 330 includes a configuration component 332, a bin component 334, a determination component 336, and an enable component 338.

The configuration component 332, in the illustrative embodiment, is to configure one or more hash profile data 306 according to hashing fields specified by a software application external to the network device 102. The configuration component 332 receives a specified amount of data sets that have a sequential value at a hash profile offset. The amount of data sets and fixed size of the data sets may be predefined as part of the configuration data 302. The offsets (e.g., hashing fields that corresponds to source IP, layer 4 source, layer 4 destination, etc.) may be defined as part of the hash profile data 306. Such combination of offsets may be referred to as a scenario. The data sets created by the configuration component 332 may be used to test a load balancing distribution given the specified offset. In practice, the offsets that are tested may correspond to a virtual LAN (VLAN) identifier, a source IP address, a MAC address, a layer 4 source address, and the like.

The bin component 334, in the illustrative embodiment, is to configure binning in the load balancer 104. For example, the bin component 334 may allocate a number of software-based bins and map these bins to those in the hardware of the network device 102. The bin component 334 may also map the software bins to destinations in the cluster 112. The bin component 334 may allocate the number of bins according to the configuration data 302. In practice, embodiments described herein may be effective if a greater number of bins than destinations are allocated.

The bin component 334 is also to populate bins with destinations using a variety of binning techniques. For instance, the bin component 334 may use a modulo binning scheme and/or a division binning scheme to assign each bin to a given destination. Of course, other binning schemes may be adapted to the embodiments presented herein. The bin component 334 may separately allocate software bins for each binning scheme. In a situation where a greater number of bins than destinations exist, multiple bins map to a given destination. Further, the bin component 334 is to determine placement of input data to a given bin based on the load balancing function and binning scheme. The bin component 334 may then place the data set in a bin at the determined index. The bin component 334 is also to track hits (e.g., a placement of data) to a given bin or to a destination once placed, and by binning scheme.

The determination component 336, in the illustrative embodiment, is to generate an unfairness score based on a number of hits to a destination for input data tested at a given hash profile offset. An input data load balancing distribution may be unfair if each destination is not equally used (based on the configured apportionment). The determination component 336 may generate the unfairness score based on a normalized standard deviation of the binning results of input data. The unfairness score is a value between 0 and 1, inclusive. An unfairness score of 1 is indicative that all data sets resulted in only one destination being selected, and an unfairness score of 0 is indicative that all destinations are equally probable and thus have a uniform distribution. An example of generating an unfairness score may include calculating a worst case standard deviation and calculating a normalized unfairness score based on the worst case standard deviation. A worst case standard deviation is indicative of a standard deviation measure in which all hits are placed in one destination. Further continuing the example, the determination component 336 may determine the unfairness score by dividing a standard deviation of the tracked hits (for a given binning scheme) by the worst case standard deviation.

Further, the determination component 336 is to identify unfairness scenarios based on sample input sets of data that are sequential at one or more offsets (e.g., in which the offsets to be tested can be predefined in hash profile data 306). The determination component 336 may evaluate an unfairness score against the unfairness criteria 304. For example, the unfairness criteria 304 may include predefined thresholds that indicate that a distribution of input data to destinations skews relatively unfairly. In practice, a threshold of 0.150 (on a normalized scale of 0 to 1) might be indicative of an unfairness scenario, although other thresholds may be used to identify an unfairness scenario.

The enable component 338, in the illustrative embodiment, is to apply a scramble function for a given hash profile associated with an unfairness score that exceeds a specified threshold. The enable component 338 may determine to apply the scramble function based on the result of the determination component 336 evaluating the unfairness criteria 304 and identifying the offset as producing an unfairness scenario. The enable component 338 may mark the corresponding offset in the hash profile data 306 as an offset for which to apply the scramble function.

The scramble function may be any technique that reassigns one or more destinations into the range of bins, for which there is a 1-to-1 mapping. For instance, a technique that swaps groups of bits in different positions may be adapted for a number of bins having a power of 2. An example of carrying out this technique is to determine a number of bins per group, split the number of group bits in 2, and swap the low and high group bits. For instance, given a 28-bit index 0xABCDEFG, low bits are shifted up to index group (e.g., BCDEFG) and high bits are used to index a bin in the group (e.g., A). The group bits are then swapped to scramble, where the group=0xBCDEFG, the group swap=0xEFGBCD, and the scrambled index is 0xEFGBCDA.

Figure 4:
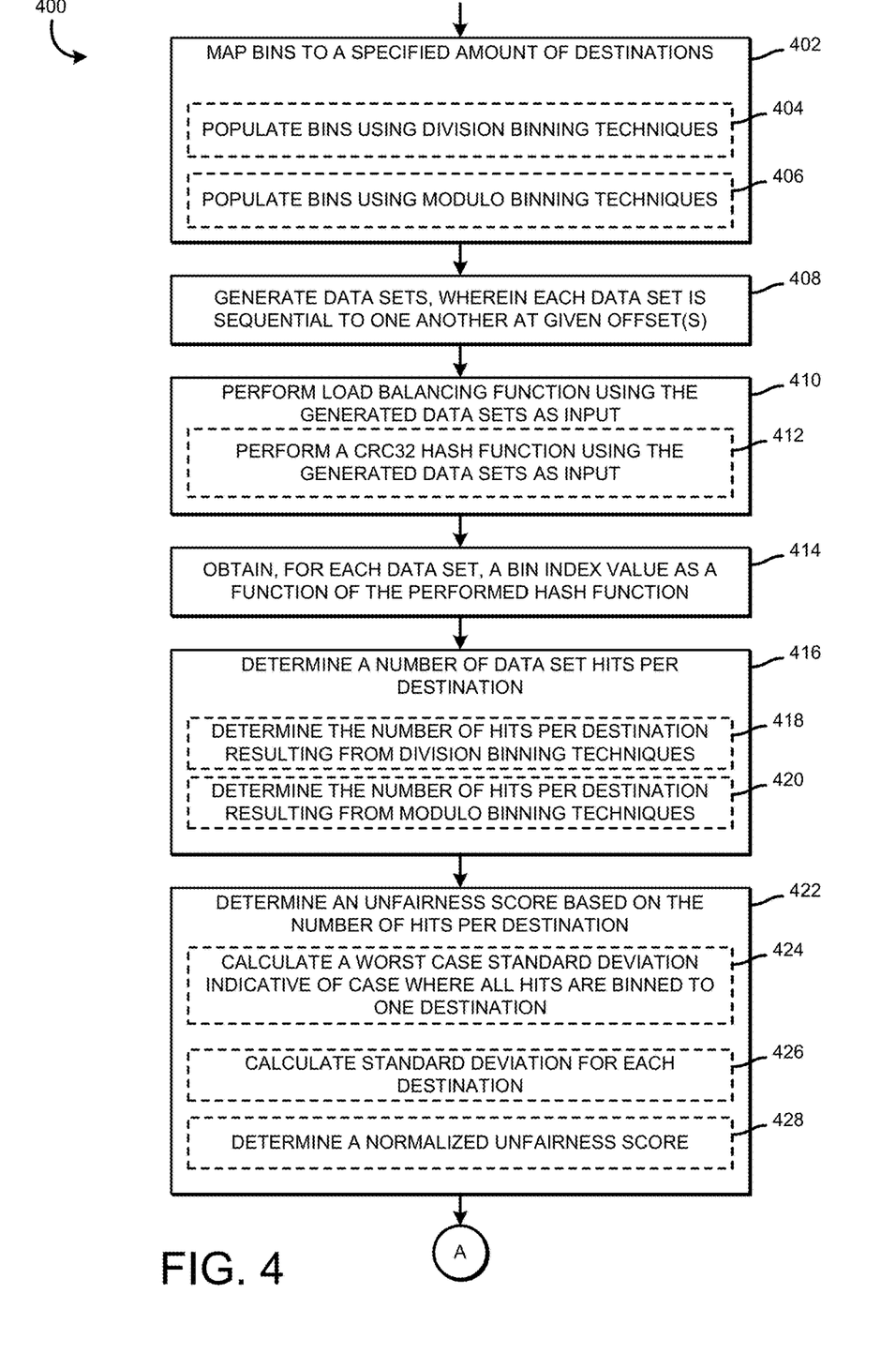
FIGS. 4 and 5 are simplified flow diagrams of a method for identifying an unfairness scenario for a load balancer under which to apply a scrambling function.
Figure 5:
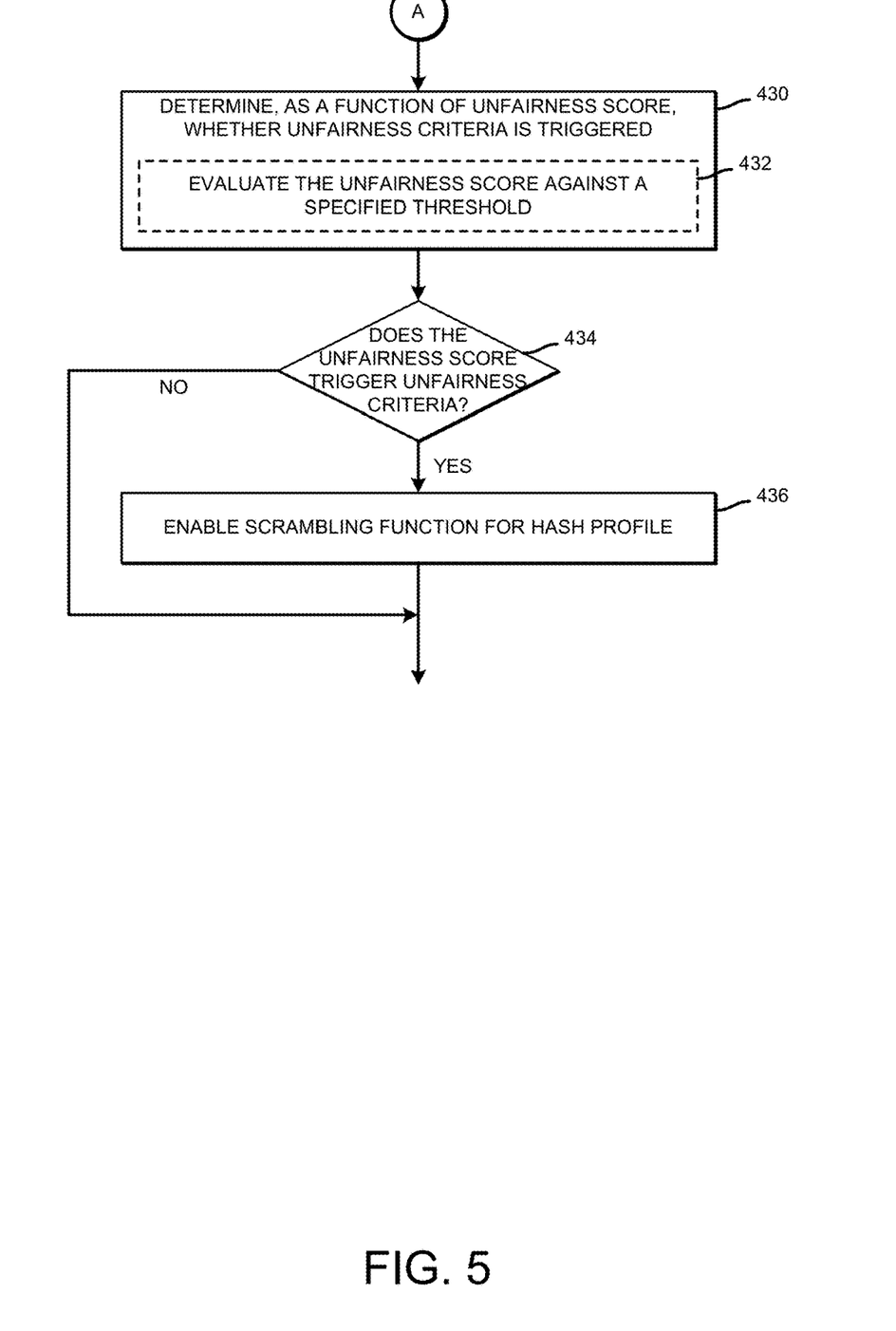

Referring now to FIGS. 4 and 5, the network device 102 may perform a method 400 to identify an unfairness scenario for a load balancer under which to apply a scrambling function. For instance, an application that uses the load balancer of the network device 102 may determine a combination of fields on which the load balancer hardware is to perform a hash function and determine the corresponding offsets for a hash profile. Method 400 is performed to determine if the fields of a hash profile is prone to unfairness if exposed to sequential data sets at the offsets specified in the hash profile. As shown, the method 400 begins in block 402, in which the network device 102 maps bins to a specified amount of destinations. For instance, in block 404, the network device 102 populates bins with destinations using division binning. And in block 406, the network device 102 populates bins using modulo binning. Separate software bins may be allocated for both the division binning and modulo binning techniques.

In block 408, the network device 102, via software executing thereon, generates data sets, in which each data set is sequential to one another at one or more offsets. The data sets may represent sample data used to test unfairness at a hash profile offset. For example, the data sets may be uniform throughout but sequential at an offset representing the last portion of the data, such as the following tuples: {0xAA, 0xAA, . . . , 0x01}, {0xAA, 0xAA, . . . , 0x02}, . . . , {0xAA, 0xAA, . . . , N}, where N represents the number of input data sets. In block 410, the network device 102 performs a load balancing function using the generated data sets as input. In some embodiments, the network device 102 emulates the same load balancing algorithm as the load balancer hardware thereon. The load balancing function may be a hash function used in determining a bin index. For instance, in block 412, the network device 102 performs a CRC32 hash function using the generated data sets as input.

In block 414, the network device 102 obtains, for each data set, a bin index value as a function of the performed hash function. The network device 102 may do so under each of the division binning scheme and the modulo binning scheme. For example, once a hash result is obtained for a given data set, the network device 102 may determine an index for bin placement by performing a division operation (or a modulo operation) on the hash result. Based on the bin placement for each data set, each data set is assigned for a given destination.

In block 416, the network device 102 determines a number of hits per destination for each data set, e.g., by counting the number of bin hits and totaling the number at each corresponding destination. For instance, in block 418, the network device 102 determines the number of hits per destination resulting from division binning techniques. In block 420, the network device 102 determines the number of hits per destination resulting from modulo binning techniques.

In block 422, the network device 102 determines an unfairness score based on the number of hits per destination. To do so, in block 424, the network device 102 calculates a worst case standard deviation. As stated, the worst case standard deviation is indicative of a case in which all hits are binned to a single destination. In block 426, the network device 102 calculates a standard deviation for the number of hits at each destination. In block 428, the network device 102 determines a normalized unfairness score. The normalized unfairness score may be a value between 0 and 1, inclusive, that is indicative of an unevenness of a load balancing distribution of the data sets to the destinations.

Continuing method 400 in FIG. 5, in block 430, the network device 102 determines, as a function of the unfairness score, whether the unfairness criteria is triggered. More particularly, in block 432, the network device 102 evaluates the unfairness score against a threshold specified by the unfairness criteria. In block 434, the network device 102 determines whether the unfairness score triggers any unfairness criteria, such as whether the unfairness score exceeds the specified threshold. If not, then the method 400 ends. However, if so, then in block 436, the network device 102 enables a scramble function for the hash profile associated with the tested offset. The network device 102 enables the scrambling function to be performed during configuration of bins amongst the destinations.

Figure 6:
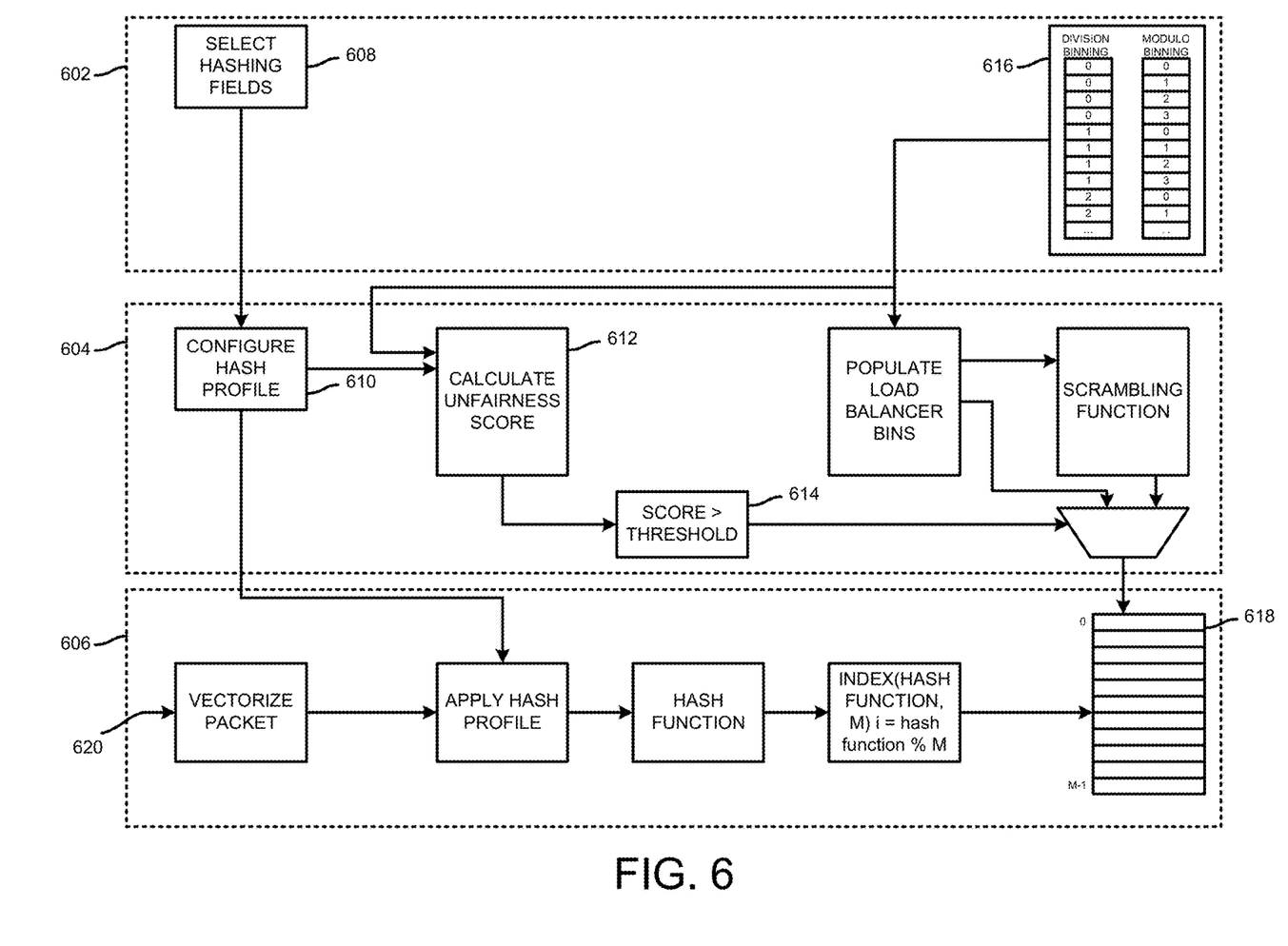
FIG. 6 is a simplified diagram of an example of enabling a scrambling function to be performed during configuration of bins amongst destinations.

Referring now to FIG. 6, a conceptual diagram of an example of applying a scramble function to a distribution of data sets to load balancer bins is shown. In particular, this example depicts flows between a software application communicating with the network device 102 (at 602), software executing on the network device 102 (at 604), and hardware components of the network device 102 (at 606). At 608, one or more hashing fields (e.g., source IP, layer 4 source (L4SRC), layer 4 destination (L4DST), etc.) are selected by the software application. At 610, the network device 102 (via software executing there) configures a hash profile corresponding to the selected fields. At 612, the network device 102 calculates the unfairness score from various inputs, such as offsets specified in the hash profile, a number of destinations, number of bins, binning by the software application communicating with the network device 102, hash vector width, and the like. At 614, the network device 102 determines whether the unfairness score exceeds a threshold (and therefore determine whether to enable the scrambling function). In 616, the software application communicating with the device configures the load balancing bins (e.g., using a division binning technique, a modulo binning technique, or others) to evaluate a binning result by the software. At 618, the software executing on the network device 102 configures the hardware bins according to whether the hash profile exhibits an unfairness scenario (e.g., the unfairness score exceeds a threshold).

At 620, a flow is presented for the operation phase of the hardware components of the network device 102. In particular, packets may be injected in the network load balancer. For example, the network device 102 may store a packet into a hash vector of fixed width based on the fields that are to be hashed. The network device 102 applies the hash profile, e.g., by performing a bitwise AND of the hash vector with the hash profile enabled fields, which results in hashed data. The network device 102 inputs the data into a hashing algorithm, which results in the bin index.

Figure 7:
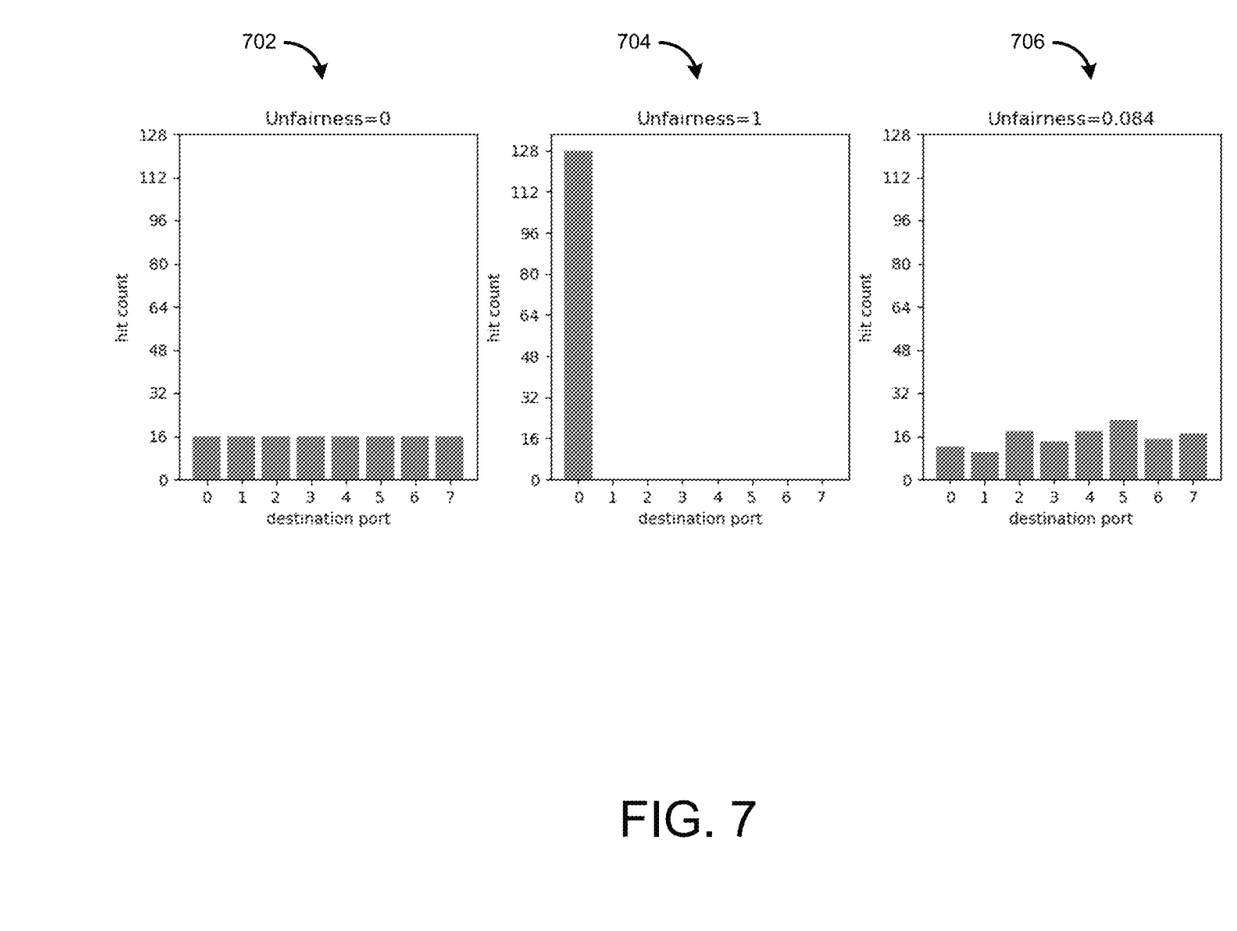
FIG. 7 is a simplified diagram of examples of load balancing distributions of network traffic over destinations.

Referring now to FIG. 7, a simplified diagram of examples 702, 704, 706 of load balancing distributions of network traffic (128 data flows) over destinations relative to unfairness score is shown. In these examples, data is distributed to eight destination ports. The x-axis represents destination ports and the y-axis represents a number of hits for each destination. Example 702 depicts a scenario in which network traffic is distributed evenly to destination ports. In such a scenario, the network device 102 (e.g., via software executing on the network device 102) calculates the unfairness score to be 0. Example 704 depicts a scenario in which all network traffic is distributed to a single destination port. In such a scenario, the network device 102 calculates the unfairness score to be 1. Example 706 depicts a scenario in which network traffic is distributed relatively evenly to each destination port. For example, destination port 5 receives a slightly larger amount of hits, whereas destination port 1, in comparison, has fewer hits. In such a scenario, the network device 102 calculates the unfairness score to be 0.084.

Figure 8:
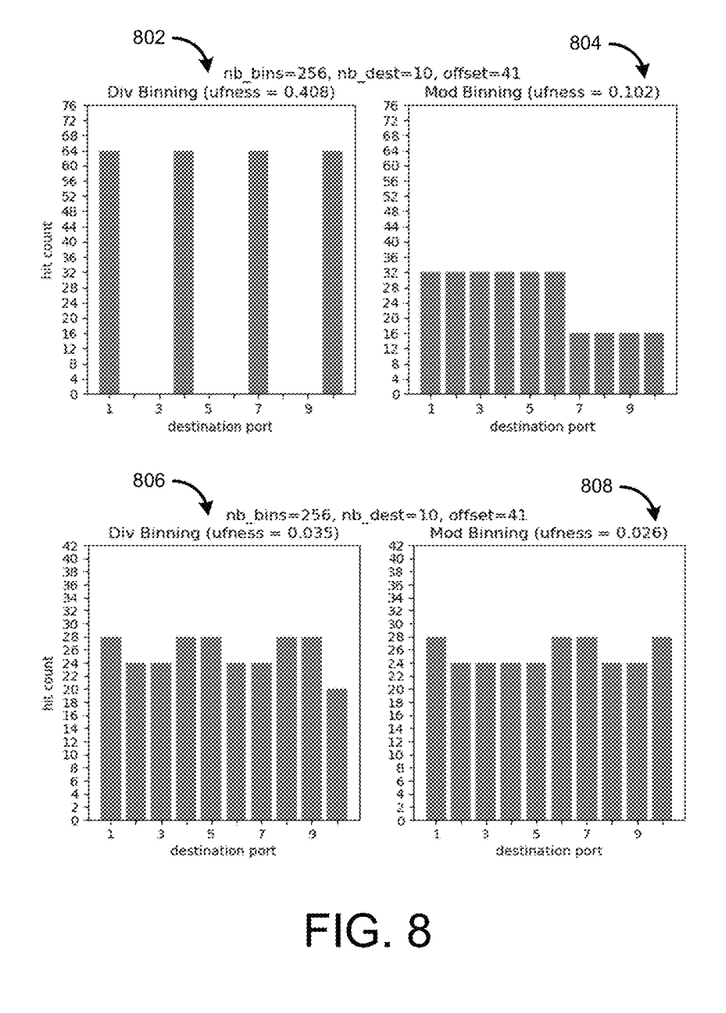
FIG. 8 is a simplified diagram of examples of load balancing distributions of network traffic over destinations before and after a scramble function is applied.

Referring now to FIG. 8, a simplified diagram of examples 802, 804, 806, and 808 of load balancing distributions of network traffic over destinations before and after a scramble function is applied. For this example, assume that a fixed data set width of 192 bytes, a number of bins totaling 256, a number of destinations totaling 10, and an offset of 41 is used. Further assume that data is sequential for the data sets at offset 41. Examples 802 and 804 show distributions of the data sets to destinations with no scramble function applied. Further, example 802 shows the distributions resulting from division binning, and example 804 shows the distributions resulting from modulo binning.

Illustratively, the distributions in examples 802 and 804 are relatively uneven. For instance, in example 802, traffic is distributed solely to destination ports 1, 4, 7, and 10, while destination ports 2, 3, 5, 6, 8, and 9 have no hits. In such a scenario, the network device 102 calculates the unfairness score as 0.408. Further, in example 802, certain ports have significantly more hits than others. For instance, destination ports 1 through 6 each have 32 hits while destination ports 7 through 10 have 16 hits. In this scenario, the network device 102 calculates the unfairness score as 0.102.

Examples 806 and 808 show distributions of the data sets to destinations with the scramble function applied. Further, example 806 shows the distributions resulting from division binning, and example 808 shows the distributions resulting from modulo binning. Illustratively, the distributions in both examples 806 and 808 are less relatively uneven than the distributions of examples 802 and 804. For instance, example 806 depicts each destination port as having between 24 to 28 hits each. In this scenario, the network device 102 calculates an unfairness score of 0.035. Example 808 depicts each destination port as having between 24 to 28 hits each. In this scenario, the network device 102 calculates an unfairness score of 0.026. In examples 806 and 808, each destination port is serviced for both division and modulo binning techniques. The average improvement in unfairness score in this example, combined for both division and modulo binning, is (−0.143) 14.3%.

EXAMPLES

Illustrative examples of the technologies disclosed herein are provided below. An embodiment of the technologies may include any one or more, and any combination of, the examples described below.

Example 1 includes a network device comprising communication circuitry; and a compute engine in communication with the communication circuitry, wherein the compute engine is to determine, with a load balancing function, a distribution for a plurality of data sets to each of a plurality of bins; determine, as a function of the distribution, an unfairness score indicative of the distribution being unequal among each of the destinations; and enable, in response to a determination that the unfairness score exceeds a specified threshold, a scrambling function to be performed during configuration of the plurality of bins with the destinations.

Example 2 includes the subject matter of Example 1, and wherein to determine, with the load balancing function, the distribution for the plurality of data sets to each of the plurality of bins comprises to determine, using a CRC32 hash function, the distribution for the plurality of data sets to each of the plurality of bins.

Example 3 includes the subject matter of any of Examples 1 and 2, and wherein to determine the unfairness score comprises to determine the unfairness score for a modulo binning distribution and for a division binning distribution.

Example 4 includes the subject matter of any of Examples 1-3, and wherein the compute engine is further to generate the plurality of data sets, wherein each of the plurality of data sets is of a fixed size.

Example 5 includes the subject matter of any of Examples 1-4, and wherein the compute engine is further to map each of the plurality of bins with one of the plurality of destinations, wherein an amount of the plurality of bins is greater than an amount of the plurality of destinations.

Example 6 includes the subject matter of any of Examples 1-5, and wherein the compute engine is further to map each of the plurality of bins with one of the plurality of destinations using division binning techniques and modulo binning techniques.

Example 7 includes the subject matter of any of Examples 1-6, and wherein to determine, as the function of the distribution, the unfairness score comprises to calculate a worst case standard deviation indicative of the plurality of data sets being distributed to one of the destinations.

Example 8 includes the subject matter of any of Examples 1-7, and wherein to determine, as the function of the distribution, the unfairness score further comprises to calculate a standard deviation of the distribution; and determine a normalized unfairness score based on the worst case standard deviation and on the standard deviation of the distribution.

Example 9 includes the subject matter of any of Examples 1-8, and wherein to enable, in response to the determination that the unfairness score exceeds a specified threshold, the scrambling function comprises to enable, in response to the determination that the unfairness score exceeds a specified threshold, the scrambling function, wherein the scrambling function remaps the destinations amongst the bins.

Example 10 includes the subject matter of any of Examples 1-9, and wherein to determine the distribution comprises to determine the distribution for a plurality of data sets, wherein each data set has the sequential value at the specified offset, wherein the specified offset corresponds to one of at least a virtual local area network (VLAN) identifier, source Internet Protocol (IP) address, or a layer 4 source (L4SRC) identifier.

Example 11 includes the subject matter of any of Examples 1-10, and wherein each data set has a sequential value at a specified offset, wherein each bin maps to one of a plurality of destinations.

Example 12 includes the subject matter of any of Examples 1-11, and wherein the network device is a network interface controller.

Example 13 includes one or more machine-readable storage media storing a plurality of instructions, which, when executed, causes a network device to determine, with a load balancing function, a distribution for a plurality of data sets to each of a plurality of bins; determine, as a function of the distribution, an unfairness score indicative of the distribution being unequal among each of the destinations; and enable, in response to a determination that the unfairness score exceeds a specified threshold, a scrambling function to be performed during configuration of the plurality of bins with the destinations.

Example 14 includes the subject matter of Example 13, and wherein to determine, with the load balancing function, the distribution for the plurality of data sets to each of the plurality of bins comprises to determine, using a CRC32 hash function, the distribution for the plurality of data sets to each of the plurality of bins.

Example 15 includes the subject matter of any of Examples 13 and 14, and wherein to determine the unfairness score comprises to determine the unfairness score for a modulo binning distribution and for a division binning distribution.

Example 16 includes the subject matter of any of Examples 13-15, and wherein the plurality of instructions further causes the network device to generate the plurality of data sets, wherein each of the plurality of data sets is of a fixed size.

Example 17 includes the subject matter of any of Examples 13-16, and wherein the plurality of instructions further causes the network device to map each of the plurality of bins with one of the plurality of destinations, wherein an amount of the plurality of bins is greater than an amount of the plurality of destinations.

Example 18 includes the subject matter of any of Examples 13-17, and wherein the plurality of instructions further causes the network device to map each of the plurality of bins with one of the plurality of destinations using division binning techniques and modulo binning techniques.

Example 19 includes the subject matter of any of Examples 13-18, wherein to determine, as the function of the distribution, the unfairness score comprises to calculate a worst case standard deviation indicative of the plurality of data sets being distributed to one of the destinations;

Example 20 includes the subject matter of any of Examples 13-19, and wherein to determine, as the function of the distribution, the unfairness score further comprises to calculate a standard deviation of the distribution; and determine a normalized unfairness score based on the worst case standard deviation and on the standard deviation of the distribution.

Example 21 includes the subject matter of any of Examples 13-20, and wherein to enable, in response to the determination that the unfairness score exceeds a specified threshold, the scrambling function comprises enable, in response to the determination that the unfairness score exceeds a specified threshold, the scrambling function, wherein the scrambling function remaps the destinations amongst the bins.

Example 22 includes a method, comprising determining, by a network device and with a load balancing function, a distribution for a plurality of data sets to each of a plurality of bins, wherein each bin maps to one of a plurality of destinations; determining, by the network device and as a function of the distribution, an unfairness score indicative of the distribution being unequal among each of the destinations; and enabling, by the network device and in response to a determination that the unfairness score exceeds a specified threshold, a scrambling function to be performed during configuration of the plurality of bins with the destinations.

Example 23 includes the subject matter of Example 22, and wherein determining, with the load balancing function, the distribution for the plurality of data sets to each of the plurality of bins comprises determining, using a CRC32 hash function, the distribution for the plurality of data sets to each of the plurality of bins.

Example 24 includes a network device comprising circuitry for determining, by a network device and with a load balancing function, a distribution for a plurality of data sets to each of a plurality of bins, wherein each bin maps to one of a plurality of destinations; means for determining, by the network device and as a function of the distribution, an unfairness score indicative of the distribution being unequal among each of the destinations; and means for enabling, by the network device and in response to a determination that the unfairness score exceeds a specified threshold, a scrambling function to be performed during configuration of the plurality of bins with the destinations.

Example 25 includes the subject matter of Example 24, and wherein the circuitry for determining, with the load balancing function, the distribution for the plurality of data sets to each of the plurality of bins comprises circuitry for determining, using a CRC32 hash function, the distribution for the plurality of data sets to each of the plurality of bins.

The invention claimed is:
1. A network device comprising:
communication circuitry; and
a compute engine in communication with the communication circuitry, wherein the compute engine is to:
  generate a plurality of data sets each having a value that has a sequential relationship with a value of a hash profile;
  determine, with a load balancing function, a distribution for the plurality of data sets to each of a plurality of bins, each bin mapped to one of a plurality of destinations;

determine, as a function of the distribution, an unfairness score indicative of the distribution being unequal among each of the destinations; and enable, in response to a determination that the unfairness score exceeds a specified threshold, a scrambling function to be performed during configuration of the plurality of bins with the destinations, the scrambling function comprising a bit-swapping technique to remap each of the plurality of destinations into the plurality of bins.

2. The network device of claim 1, wherein to determine, with the load balancing function, the distribution for the plurality of data sets to each of the plurality of bins comprises to determine, using a CRC32 hash function, the distribution for the plurality of data sets to each of the plurality of bins.

3. The network device of claim 1, wherein to determine the unfairness score comprises to determine the unfairness score for a modulo binning distribution and for a division binning distribution.

4. The network device of claim 1, wherein to generate the plurality of data sets comprises to generate each of the plurality of data sets at a fixed size.

5. The network device of claim 1, wherein the compute engine is further to map each of the plurality of bins with one of the plurality of destinations, wherein an amount of the plurality of bins is greater than an amount of the plurality of destinations.

6. The network device of claim 1, wherein the compute engine is further to map each of the plurality of bins with one of the plurality of destinations using division binning techniques and modulo binning techniques.

7. The network device of claim 1, wherein to determine, as the function of the distribution, the unfairness score comprises to:

calculate a worst case standard deviation indicative of the plurality of data sets being distributed to one of the destinations.

8. The network device of claim 7, wherein to determine, as the function of the distribution, the unfairness score further comprises to:

calculate a standard deviation of the distribution; and
determine a normalized unfairness score based on the worst case standard deviation and on the standard deviation of the distribution.

9. The network device of claim 1, wherein to enable, in response to the determination that the unfairness score exceeds a specified threshold, the scrambling function comprises to enable, in response to the determination that the unfairness score exceeds a specified threshold, the scrambling function, wherein the scrambling function remaps the destinations amongst the bins.

10. The network device of claim 1, wherein to determine the distribution comprises to determine the distribution for a plurality of data sets, wherein each data set has a sequential value at a specified offset, wherein the specified offset corresponds to one of at least a virtual local area network (VLAN) identifier, source Internet Protocol (IP) address, or a layer 4 source (L4SRC) identifier.

11. The network device of claim 1, wherein each data set has a sequential value at a specified offset, wherein each bin maps to one of a plurality of destinations.

12. The network device of claim 1, wherein the network device is a network interface controller.

13. One or more non-transitory machine-readable storage media storing a plurality of instructions, which, when executed, causes a network device to:

generate a plurality of data sets each having a value that has a sequential relationship with a value of a hash profile;

determine, with a load balancing function, a distribution for the plurality of data sets to each of a plurality of bins, each bin mapped to one of a plurality of destinations;

determine, as a function of the distribution, an unfairness score indicative of the distribution being unequal among each of the destinations; and enable, in response to a determination that the unfairness scores exceeds a specified threshold, a scrambling function to be performed during configuration of the plurality of bins with the destinations, the scrambling function comprising a bit-swapping technique to remap each of the plurality of destinations into the plurality of bins.

14. The one or more non-transitory machine-readable machine storage media of claim 13, wherein to determine, with the load balancing function, the distribution for the plurality of data sets to each of the plurality of bins comprises to determine, using a CRC32 hash function, the distribution for the plurality of data sets to each of the plurality of bins.

15. The one or more non-transitory machine-readable machine storage media of claim 13, wherein to determine the unfairness score comprises to determine the unfairness score for a modulo binning distribution and for a division binning distribution.

16. The one or more non-transitory machine-readable machine storage media of claim 13, wherein to generate the plurality of data sets comprises to generate, each of the plurality of data sets at a fixed size.

17. The one or more non-transitory machine-readable machine storage media of claim 13, wherein the plurality of instructions further causes the network device to map each of the plurality of bins with one of the plurality of destinations, wherein an amount of the plurality of bins is greater than an amount of the plurality of destinations.

18. The one or more non-transitory machine-readable machine storage media of claim 13, wherein the plurality of instructions further causes the network device to map each of the plurality of bins with one of the plurality of destination using division binning techniques and modulo binning techniques.

19. The one or more non-transitory machine-readable machine storage media of claim 13, wherein to determine, as the function of the distribution, the unfairness score comprises to:

to calculate a worst case standard deviation indicative of the plurality of data sets being distributed to one of the destinations.

20. The one or more non-transitory machine-readable machine storage media of claim 19, wherein to determine, as the function of the distribution, the unfairness score further comprises to:

calculate a standard deviation of the distribution; and
determine a normalized unfairness score based on the worst case standard deviation and on the standard deviation of the distribution.

21. The one or more non-transitory machine-readable machine storage media of claim 13, wherein to enable, in response to the determination that the unfairness score exceeds a specified threshold, the scrambling function comprises enable, in response to the determination that the unfairness score exceeds a specified threshold, the scrambling function, wherein the scrambling function remaps the destinations amongst the bins.

22. A method, comprising:
generating, by a network device, a plurality of data sets each having a value that has a sequential relationship with a value of a hash profile;
determining, by the network device and with a load balancing function, a distribution for a plurality of data sets to each of a plurality of bins, wherein each bin maps to one of a plurality of destinations;
determining, by the network device and as a function of the distribution, an unfairness score indicative of the distribution being unequal among each of the destinations; and
enabling, by the network device and in response to a determination that the unfairness score exceeds a specified threshold, a scrambling function to be performed during configuration of the plurality of bins with the destinations, the scrambling function comprising a bit-swapping technique to remap each of the plurality of destinations into the plurality of bins.

23. The method of claim 22, wherein determining, with the load balancing function, the distribution for the plurality of data sets to each of the plurality of bins comprises determining, using a CRC32 hash function, the distribution for the plurality of data sets to each of the plurality of bins.

24. A network device comprising:
means for generating a plurality of data sets each having a value that has a sequential relationship with a value of a hash profile
circuitry for determining, with a load balancing function, a distribution for a plurality of data sets to each of a plurality of bins, wherein each bin maps to one of a plurality of destinations;
means for determining, as a function of the distribution, an unfairness score indicative of the distribution being unequal among each of the destinations; and
means for enabling, in response to a determination that the unfairness score exceeds a specified threshold, a scrambling function to be performed during configuration of the plurality of bins with the destinations, the scrambling function comprising a bit-swapping technique to remap each of the plurality of destinations into the plurality of bins.

25. The network device of claim 24, wherein the circuitry for determining, with the load balancing function, the distribution for the plurality of data sets to each of the plurality of bins comprises circuitry for determining, using a CRC32 hash function, the distribution for the plurality of data sets to each of the plurality of bins.

* * * * *